June 2, 1953 — A. T. GORMAN — 2,640,732
FLUID PRESSURE BRAKE RELEASE INDICATING MEANS
Filed March 25, 1950
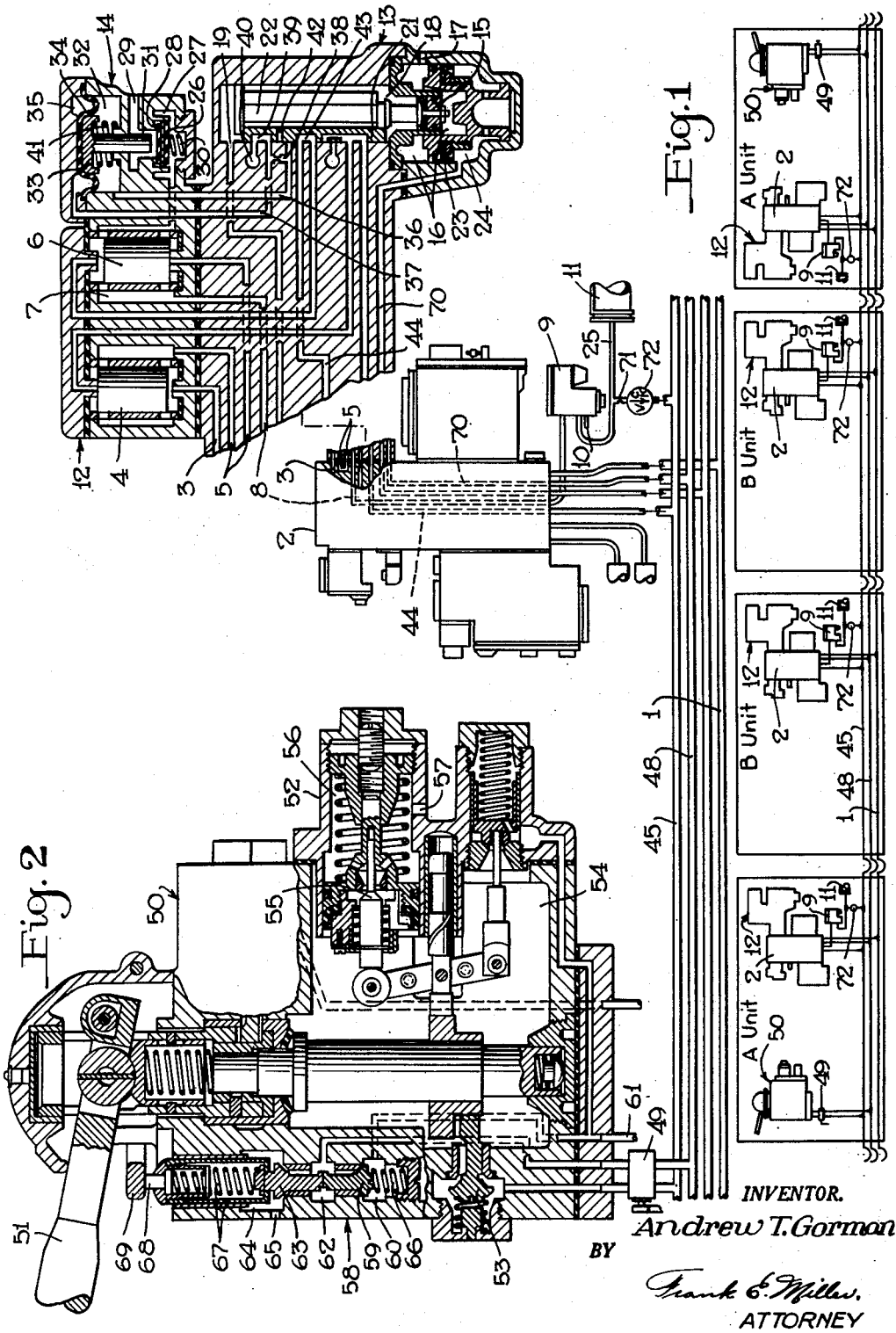
INVENTOR.
Andrew T. Gorman
BY
Frank E. Miller
ATTORNEY Patented June 2, 1953

2,640,732

UNITED STATES PATENT OFFICE 2,640,732

FLUID PRESSURE BRAKE RELEASE INDICATING MEANS

Andrew T. Gorman, Pitcairn, Pa., assignor to Westinghouse Air Brake Company, a corporation of Pennsylvania Application March 25, 1950, Serial No. 151,876

7 Claims. (Cl. 303—26)

This invention relates to fluid pressure brakes and more particularly to the type for use on railway locomotives.

The 24 RL locomotive brake equipment shown and described in Westinghouse Air Brake Company's Instruction Pamphlet No. 5066, dated March 1948, is employed on modern diesel locomotives comprising a multiple of connected units usually including like, leading and trailing A units and one or more like, intermediate B units. On each of these units there is provided a brake controlling valve device adapted to respond to a reduction in pressure of fluid in a brake pipe, extending through the several units of the locomotive for connection with the brake pipe on cars of a train, to apply the fluid pressure brakes on the respective unit when the fluid pressure brakes on the connected train of cars are applied in response to such reduction. An independent release valve device is associated with each of the brake controlling valve devices for operation by fluid under pressure to release the brakes on the unit independent of control from the brake pipe and hence without necessitating release of brakes on the cars of the train. An actuating pipe extends through the several units of the locomotive and to this pipe are connected the independent release valve devices on said units, and an engineer's independent brake valve device on each of the two A or end units of the locomotive is connected to said pipe through a cut-out valve which on the trailing A unit is closed. The independent brake valve device on the leading A unit is operative to a release position to supply fluid under pressure to the actuating pipe and thence to the several independent release valve devices to operate said release valve devices to release the fluid pressure brakes on the units as above mentioned.

A multiple unit diesel locomotive and an actuating pipe thereon are relatively long and due to resistance to flow of fluid under pressure through said pipe, the pressure of fluid supplied to said pipe by the independent brake valve device on the leading A unit will increase much more rapidly on the leading unit than on the trailing unit. As a result, the independent release valve device on the leading unit will operate in response to the pressure of fluid supplied to the actuating pipe to initiate a release of fluid pressure brakes on the leading unit sooner than the independent release valve devices on the other units will respond to pressure in said pipe to initiate a release of fluid pressure brakes thereon. This is satisfactory if the handle of the independent brake valve device is held in its release position for the necessary and relatively short length of time required to effect a release of brakes on the trailing A unit at which time a release of brakes on all other units of the locomotive will have occurred. However, if the independent brake valve device is held in its release position only long enough to effect a desired release of the fluid pressure brakes on the leading A unit, and which release will be indicated by a gage in the locomotive cab connected to the brake cylinder device on said unit, and is then moved out of release position for venting the actuating pipe, all of the independent release valve devices throughout the locomotive will move out of their brake release position at a time when the brakes on the units to the rear of the leading A unit may be only partially released, since the brakes on the units to the rear of the leading A unit will not start to release as soon as the brakes on the leading A unit starts to release. In fact, if the independent brake valve device on the leading A unit is operated to and then out of its release position for releasing the locomotive brakes in steps, observed by the pressure gage connected to the brake cylinder device on said unit, it is possible to effect a full release of brakes on said unit without obtaining any release of brakes on the trailing A unit. It is undesirable to have brakes on a locomotive thus applied when it is intended that they be released since excessive wear, heating and possible loosening of the tires on the locomotive wheels may result.

The principal object of the invention is therefore the provision of means for signalling the engineer on the leading unit of the locomotive whenever brakes are applied on any unit of the locomotive to thereby insure, in effecting a release of locomotive brakes independent of the brake pipe, that he will continue brake release operation of the independent brake valve device until a full release of brakes on all units is obtained.

Other objects and advantages will become apparent from the following more detailed description of the invention.

In the accompanying drawing; Fig. 1 is a diagrammatic view of a multiple unit locomotive with brake apparatus pertinent to the invention shown in outline on each unit; and Fig. 2 is a diagrammatic view, partly in section and partly in outline, of brake apparatus employed on the different units of the locomotive.

Description

The fluid pressure brake equipment embodying the invention, and for use on multiple unit locomotives, such as the diesel type comprising two end A units either one of which may be at the leading end of the locomotive, and two intermediate B units connected together and to said end units, and which units are indicated in Fig. 1 of the drawing by suitable legends, generally may be like that disclosed and described in Patent 2,173,940, issued to E. E. Hewitt et al. on September 26, 1939, modified as in Patent 2,464,977, issued to A. T. Gorman on March 22, 1949. Still further, the brake equipment, less the invention, is fully disclosed in the instruction pamphlet above referred to. In view of these patents and instruction pamphlet, only such parts of a locomotive brake equipment are therefore shown in the drawing as deemed necessary to a clear understanding of the invention, and for like reasons the following description thereof will also be limited.

As shown in the drawing, the brake equipment for the locomotive comprises a brake pipe 1 extending through the several units of the locomotive for connection with the brake pipe on a train of cars at either end of the locomotive, depending upon which end is the leading end. An automatic brake valve device (not shown) adapted to be caried by each of the A units and to be connected to the brake pipe 1 is operable in the usual manner to effect a reduction in pressure in said brake pipe and thereby an application of brakes on the locomotive (and cars of a train) as will be subsequently described, and to also recharge said brake pipe for releasing such application in well-known manner.

On each of the locomotive units there is provided a brake controlling valve device 2 adapted to respond to a reduction in pressure in brake pipe 1 for supplying fluid under pressure to a passage 3 from which it is adapted to flow past the lower end of a double check valve 4 to a passage 5 and thence past the lower end of a double check valve 6 to an annular chamber 7 surrounding check valve 6 and from said chamber through a passage 8 to a relay valve device 9 which is adapted to respond to such pressure to provide from a pipe 10 fluid at a corresponding pressure in a pipe 25 and thereby in a brake cylinder device 11 for applying the brakes on the respective unit. The pipe 10 is adapted to be constantly supplied with fluid under pressure from the usual main reservoir pipe (not shown) extending through the locomotive.

Associated with each of the brake controlling valve devices 2 is an interlock valve device 12 comprising, in addition to the double check valves 4 and 6, a selector valve device 13 and an independent brake release valve device 14. Each selector valve device 13 comprises a piston 15 open at one side to a chamber 16 in constant communication with atmosphere through a vent port 17 and open at the opposite side to a valve chamber 18 adapted to be constantly supplied through passage 19 with fluid under pressure from the usual main reservoir on the locomotive. A slide valve 21 contained in chamber 18 is connected by a stem 22 to the piston 15 for movement therewith. The selector valve device further comprises a piston 23 of greater area than and arranged in coaxial relation to piston 15 and subject on one side to atmospheric pressure in chamber 16 and on the opposite side to pressure of fluid in a chamber 24.

When chamber 24 is vented pressure of fluid in chamber 18 will move the piston 15 and thereby the slide valve 21 to a normal position in which they are shown in the drawing. When fluid under pressure is supplied to chamber 24, piston 23, being of greater area than piston 15, will move against and then actuate piston 15 and the slide valve 21 to an independent brake release position.

Each independent release valve device 14 comprises a check valve 26 contained in a chamber 27 which is open to the annular chamber 7 encircling the double check valve 6 and thereby to passage 8 connected to the relay valve device 9. The check valve 26 is arranged to cooperate with a seat 28 in the casing for closing communication between chamber 27 and an atmospheric vent port 29, a spring 30 contained in chamber 27 acting on the check valve 26 for urging it into contact with said seat. Slidably mounted in a bore in the casing and extending through the passage 29 for engagement with the seat side of check valve 26 is a stem 31 which also extends into a chamber 32 where it is provided with a follower head 33 engaging one side of a flexible diaphragm 34. At the one side of diaphragm 34 is chamber 32 while at the opposite side is a chamber 35. The chambers 32 and 35 are connected, respectively, by passages 36 and 37 to the seat of the slide valve 21 and said passages are connected to each other through a choked communication 38.

The selector slide valve 21 has a cavity 39 which, in the normal position of said valve, opens passage 37 to an atmospheric vent port 40, the chamber 32 being also vented at this time through the choked communication 38 and passage 37. With the pressures of fluid in chambers 32 and 35 thus equal a spring 41 contained in chamber 32 and acting on the follower head 33 will deflect the diaphragm 34 and move the stem 31 to the position in which they are shown in the drawing and in which said stem is out of contact with the check valve 26 to permit closing thereof by spring 30. With the check valve 26 thus closed fluid supplied by the brake controlling valve device 2 to operate the relay valve device 9 for effecting an application of brakes on the locomotive unit will be held against dissipation through the atmospheric vent port 29, as will be apparent.

When, by operation of piston 23 in response to supply of fluid pressure in chamber 24, the slide valve 21 is moved out of its normal position in which it is shown in the drawing to its brake release position, a port 42 in said slide valve will move into registry with passage 37 and open said passage to valve chamber 18, as a result of which, fluid under pressure from said valve chamber will flow to passage 37 and thence to diaphragm chamber 35. When fluid under pressure is thus supplied to passage 37 some of the fluid will flow therefrom through the choked communication 38 to passage 36, but the latter passage will be open at this time through a cavity 43 in said slide valve to a passage 44 connected to an application and release pipe 45 extending through the locomotive and which will be vented as will be later described. As a result, sufficient pressure will be promptly obtained in diaphragm chamber 35 over that in chamber 32 to deflect diaphragm 34 against spring 41 to actuate stem 31 to unseat the check valve 26. With the fluid pressure brakes on the locomotive unit applied by operation of the brake controlling valve device 2, the unseating of check valve 26 will allow the actuating fluid pressure in the relay valve device 9 to be vented to atmosphere through the atmospheric port 29 whereupon said relay valve device will operate to release the fluid under pressure from the brake cylinder device 11 for effecting release of the brakes on the locomotive unit. It will be noted, therefore, that an automatic application of fluid pressure brakes on the locomotive effected in response to a reduction in pressure of fluid in brake pipe 1 and consequent operation of the brake controlling valve device 2 may be released independent of the brake pipe 1 and hence independent of the brakes on cars of a train by supply of fluid under pressure to piston chamber 24 of the selector valve device 13.

An actuating pipe 48, as well as the application and release pipe 45, extend through the several units of the locomotive and on each of the A units both of said pipes are connected through a cut-out valve 49 to an engineer's independent brake valve device 50. On the leading A unit of the locomotive the cut-out valve 49 will open communication between the pipes 45 and 48 and the respective independent brake valve device 50 while on the trailing A unit said valve will close said communication.

In the drawing it will be assumed that the A unit at the left-hand end of the locomotive illustrated in Fig. 1 is the leading unit of the locomotive and the cut-out valve 49 associated with this unit is therefore in its communication opening position, while it will be assumed that the A unit at the right hand end of said figure is the trailing unit of the locomotive and on this trailing unit the cut-out valve 49 will be in its communication closing position.

Each engineer's independent brake valve device 50 comprises an engineer's control handle 51 which is movable in a horizontal plane to control operation of a self-lapping valve mechanism 52 for varying pressure of fluid in the application and release pipe 45 to effect by way of the respective selector valve devices 13, when in their normal position, independent application and release of locomotive brakes in a manner fully disclosed in the above referred to patent and in view of which a description thereof is not believed essential in the present application, it being merely desired to point out that with the brake valve handle in its normal brake release position, in which it is shown in the drawing, the application and release pipe 45 will be open to atmosphere past an open cut-off valve 53 in said brake valve device to a chamber 54 and thence past an open release valve 55 in the self-lapping valve mechanism 52 to a chamber 56 which is in constant communication with atmosphere through a vent port 57. The handle 51 of each independent brake valve device 50 is also operable by vertical movement to control operation of an independent brake release valve device 58.

The independent release valve device 58 associated with each of the independent brake valve devices 50 comprises a supply valve 59 controlled in the chamber 60 which is constantly supplied with fluid under pressure from the main reservoir pipe on the locomotive via pipe 61, said supply valve being arranged to control flow of fluid under pressure from said chamber to a chamber 62 which is open to the actuating pipe 48. The independent release valve device further comprises a release valve 63 for controlling communication between chamber 62 and a chamber 64 which is open to atmosphere through a vent 65, the two valves 59 and 63 having fluted stems engaging each other in chamber 62 so that the valves will move in unison. A spring 66 in chamber 60 acts on the valve 59 for urging it to a closed position and for at the same time opening the valve 63. A spring and plunger means 67 connect the valve 63 to a vertically movable element 68 engaged by a bail 69 adapted to be operated by depression of the handle 51 from its normal elevated position, in which it is shown in the drawing, for seating the valve 63 and unseating the valve 59. When the handle 51 is released of manual pressure the two valves 59 and 63 will under the action of spring 56 assume the position in which they are shown in the drawing and in which the actuating pipe 48 is vented.

It will now be seen that when the handle 51 of the independent brake valve device 50 on the leading A unit of the locomotive is depressed to close valve 63 and open valve 59, fluid under pressure will be supplied to the actuating pipe 48 throughout the length of the locomotive and on each locomotive unit fluid from said pipe will flow through a passage 70 to piston chamber 24 and operate the selector valve device 13 to its independent brake release position for effecting operation of the respective independent release valve device 14 to open the valve 26 therein. It will thus be apparent that after an automatic application of brakes has been effected on the locomotive by operation of the brake controlling valve devices in response to a reduction in pressure in the brake pipe 1, such an application may be released by depressing the independent brake valve handle 51 on the leading unit of the locomotive. It will also be noted that when the independent brake valve handle 51 on the leading A unit is depressed, the pressure of fluid in the actuating pipe 48 and piston chamber 24 of the selector valve device 13 on the leading unit will increase ahead of that on the other units of the locomotive so that on the leading unit the independent release valve device 14 will operate to initiate a release of an automatic application of brakes on that unit before a release of brakes on the other units of the locomotive commences. As a result, if the handle 51 is permitted to return to its elevated position as soon as a gage connected to the brake cylinder device 11 on the leading A unit indicates a complete release of brakes thereon, the actuating pipe 48 will be vented through the independent release valve device 58 on the brake valve device and the selector valve devices 13 on the several units will return to their normal position, in which they are shown on the drawing and in which chambers 35 of the independent release valve devices 14 will be vented to atmosphere to permit closure of the release valves 26 whereby the release of brakes on the units to the rear of the leading A unit may be undesirably stopped before a complete release has been obtained. It is to be noted, however, that if the independent brake valve handle 51 is held depressed for a sufficient period of time, and which time is actually relatively short, that the selector valve devices 13 will remain in their brake release position to insure a complete release of brakes on all units of the locomotive.

The structure and operation of the brake equipment so far described is the same as in the above referred to references, it being merely desired to reiterate that since the supply of fluid to the actuating pipe 48 occurs at the leading A unit of the locomotive, the pressure in said pipe required for operating the selector valve devices 13 on the different units will be obtained first on the leading A unit and then serially on the other locomotive units toward the rear with the possibility of the undesired results above mentioned.

According to the invention, on each of the locomotive units I connect the brake cylinder pipe 25 to the application and release pipe 45 through a communication including a serially arranged choke 71 and check valve 72, which check valve is arranged to permit flow of fluid under pressure in the direction from the brake cylinder pipe 25 to pipe 45 but to prevent reverse flow of fluid under pressure. With this arrangement whenever there is fluid under pressure in any one of the brake cylinder devices 11 on the different units of the locomotive there will be a leak of such fluid through the choke 71 to the actuating pipe 45 thence to the independent brake valve device 50 on the controlling A unit of the locomotive and past the open cut-off valve 53 therein to chamber 54 and from said chamber to atmosphere through the vent port 57. Therefore, when effecting a release of brakes on the locomotive independent of the brake pipe 1, if the engineer releases handle 51 of the independent brake valve device prior to a complete release of brakes occurring on all units of the locomotive, fluid under pressure from the brake cylinder device 11 on the unit or units of the locomotive on which the brakes are still applied will flow past the check valve 52 to pipe 45 and thence to atmosphere through the exhaust port 57 at the independent brake valve device 50. This flow of fluid under pressure through exhaust port 57 to atmosphere will cause a warning noise or signal to the engineer that the brakes on some unit or units of the locomotive are still applied whereby he may continue operation of the independent brake valve device by depressing of handle 51 until a complete release of brakes on all units is obtained at which time the blow through the exhaust port 57 will cease.

The check valve 72 on each unit is provided to prevent flow of fluid under pressure from the application and release pipe 45 directly to the brake cylinder pipe 11 so that such supply will occur through and be controlled by the interlock valve device 12, in the usual manner. The choke 71 limits the flow of fluid under pressure from the brake cylinder pipe 25 to a very small amount so that when the brakes on the several units of the locomotive are applied by operation of the brake controlling valve devices 2 such loss will be negligible and in no way interfere with a brake application since the relay valve device 9 will operate to maintain the pressure of fluid in the brake cylinder devices against such loss from the usual main reservoir on the locomotive through the pipe 10.

If the control ends of the locomotive are changed, the operation of the brake equipment will be the same as that above described.

Summary

From the above description it will now be seen that I have provided means adapted to be associated with the brake equipment on each unit of a multiple unit locomotive for indicating when, by operation of the independent brake valve device on the leading unit, a complete release of brakes on all the units of the locomotive has occurred whereby difficulty such as hereinbefore described may be completely avoided.

Having now described my invention, what I claim as new and desire to secure by Letters Patent, is:

1. In a fluid pressure brake equipment for a multiple unit locomotive, in combination, braking means on each unit operable by fluid under pressure, a first pipe, a second pipe, an engineer's brake valve device on one of said units for either supplying fluid under pressure to said first pipe or for opening said first pipe to atmosphere and for selectively supplying fluid under pressure to and for opening said second pipe to atmosphere while said first pipe is open to atmosphere, valve means on each unit having a normal position for opening said first pipe to the respective braking means and operable upon supply of fluid under pressure to said second pipe to a brake release position for closing communication between said first pipe and the respective braking means and for releasing fluid under pressure from the respective braking means, and a communication on each unit connecting said braking means to said first pipe including check valve means for preventing flow of fluid under pressure in the direction from said first pipe to said braking means but providing for flow of fluid under pressure in a reverse direction, and a choke in said communication on each unit.

2. In a fluid pressure brake equipment for a multiple unit locomotive, in combination, fluid pressure operable brake cylinder means on each unit, a brake pipe, brake controlling means on each unit operative upon a reduction in pressure of fluid in said brake pipe to effect a supply of fluid under pressure to said brake cylinder means, brake release means on each unit operable by fluid under pressure to effect release of fluid under pressure from the respective brake cylinder means, a release pipe extending through the locomotive connected to the several brake release means, an engineer's brake valve device on a leading one of said units operative to supply fluid under pressure to said release pipe, a second pipe open to atmosphere at said brake valve device and extending through the locomotive, and means on each unit of the locomotive connecting the respective brake cylinder means to said second pipe and including a choke for limiting flow of fluid under pressure from the brake cylinder means to said second pipe.

3. In a fluid pressure brake equipment for a multiple unit locomotive, in combination, a brake pipe extending through said locomotive, fluid pressure operable brake applying means on each unit of said locomotive, brake control means on each unit of said locomotive operative in response to a reduction in pressure of fluid in said brake pipe to supply fluid under pressure to the respective brake applying means, release means on each unit for releasing fluid under pressure from the respective brake applying means, selector means on each unit operable by fluid under pressure to a position for effecting operation of the respective release means, a release pipe extending through the locomotive and connected to each selector means, an engineer's brake valve device on one end unit of the locomotive operative to supply fluid under pressure to said release pipe, another pipe extending through the locomotive with one end terminating at said brake valve device and open to atmosphere, a conduit opening each brake applying means to said other pipe, and a choke in each conduit.

4. In a fluid pressure brake equipment for a multiple unit locomotive, in combination, a brake pipe extending through said locomotive, fluid pressure operable brake applying means on each unit of said locomotive, brake controlling means on each unit of said locomotive operative in response to a reduction in pressure of fluid in said brake pipe to supply fluid under pressure to the respective brake applying means, an application and release pipe extending through the locomotive, a release pipe extending through the locomotive, release means on each unit for releasing fluid under pressure from the respective brake applying means, selector means on each unit connected to said release pipe and operable upon venting of said release pipe to establish a communication for supply of fluid under pressure from said application and release pipe to the respective brake applying means and operative upon supply of fluid under pressure to said release pipe to close said communication and effect operation of the respective release means, one-way flow means on each unit providing for flow of fluid under pressure from the respective fluid pressure operable brake applying means to said application and release pipe and including choke means for restricting such flow, and an engineer's brake valve device for supplying fluid under pressure to and releasing fluid under pressure from said application and release pipe and having one position for supplying fluid under pressure to said release pipe while venting said application and release pipe.

5. In a fluid pressure brake equipment for a multiple unit locomotive, in combination, a brake cylinder device on each unit, a pipe on each unit connected to said brake cylinder device, a fluid pressure controlled relay valve device on each unit for varying pressure of fluid in said brake cylinder device in accordance with pressure of controlling fluid in said relay valve device, means for supplying fluid under pressure to said relay valve device to operate same, a release pipe extending through the locomotive, valve means on each unit responsive to pressure of fluid in said release pipe to release fluid under pressure from the respective relay valve device, an engineer's brake valve device on one of the end units of the locomotive arranged to supply fluid under pressure to said release pipe, a second pipe extending through the several units and terminating at one end at said brake valve device, a conduit on each unit connecting the respective brake cylinder pipe to said second pipe, and a choke in each conduit for limiting flow of fluid under pressure from the respective brake cylinder pipe.

6. In a fluid pressure brake equipment for a multiple unit locomotive, in combination, a brake cylinder device on each unit, a pipe on each unit connected to the respective brake cylinder device, a fluid pressure controlled relay valve device on each unit for varying pressure of fluid in the respective brake cylinder device in accordance with pressure of controlling fluid in said relay valve device, a brake pipe extending through the locomotive, brake controlling valve means on each unit operative upon a reduction in pressure of fluid in said brake pipe to supply fluid under pressure to the respective relay valve device, an application and release pipe extending through the locomotive, a release pipe extending through the locomotive, an engineer's brake valve device on one of the end units of the locomotive for varying pressure of fluid in said application and release pipe and for releasing fluid under pressure from said release pipe and having one position for supplying fluid under pressure to said release pipe and at the same time opening said application and release pipe to atmosphere, selector means on each unit responsive to release of fluid under pressure from said release pipe to establish a communication for control of the respective relay valve device by pressure of fluid in said application pipe and operative upon supply of fluid under pressure to said release pipe to close said communication and to effect release of fluid under pressure from said relay valve device, a conduit on each unit opening the respective brake cylinder pipe to said application and release pipe, a check valve in each conduit providing for flow of fluid under pressure only in the direction from the respective brake cylinder pipe to said application and release pipe, and a choke in each conduit for limiting flow of fluid under pressure therethrough.

7. In a fluid pressure brake equipment for a multiple unit locomotive, in combination, braking means on each unit operable by fluid under pressure, a first pipe, a second pipe, an engineer's brake valve device on one of said units for either supplying fluid under pressure to said first pipe or for opening said first pipe to atmosphere and for selectively supplying fluid under pressure to and for opening said second pipe to atmosphere while said first pipe is open to atmosphere, valve means on each unit having a normal position for opening said first pipe to the respective braking means and operable upon supply of fluid under pressure to said second pipe to a brake release position for closing communication between said first pipe and the respective braking means and for releasing fluid under pressure from the respective braking means, means on each unit responsive to pressure of fluid in the respective braking means to provide fluid under pressure to one of said pipes, and a choke on each unit for limiting the rate of supply of fluid under pressure to said one pipe by the last named means.

ANDREW T. GORMAN.

References Cited in the file of this patent

UNITED STATES PATENTS

| Number | Name | Date |
|---|---|---|
| 1,004,000 | Emery | Sept. 26, 1911 |
| 1,041,091 | Johnson | Oct. 15, 1912 |
| 2,068,319 | Fitch | Jan. 19, 1937 |

OTHER REFERENCES

Instruction Pamphlet No. 5032, May 1929, W. A. B. Co., Pittsburgh, Pa.